July 21, 1936. W. B. MATHEWSON 2,048,348
MATTRESS TUFTING MACHINE
Filed Feb. 14, 1934 11 Sheets-Sheet 5

Inventor.
Wilfred B. Mathewson
by Heard Smith & Tennant.
Attys.

Fig. 8.

July 21, 1936.  W. B. MATHEWSON  2,048,348
MATTRESS TUFTING MACHINE
Filed Feb. 14, 1934  11 Sheets-Sheet 8

Fig.10.

Inventor.
Wilfred B. Mathewson
by Heard Smith & Tennant.
Attys.

July 21, 1936.  W. B. MATHEWSON  2,048,348

MATTRESS TUFTING MACHINE

Filed Feb. 14, 1934  11 Sheets-Sheet 10

Inventor.
Wilfred B. Mathewson
by Heard Smith & Tennant.
Attys.

July 21, 1936.  W. B. MATHEWSON  2,048,348
MATTRESS TUFTING MACHINE
Filed Feb. 14, 1934  11 Sheets-Sheet 11

Inventor.
Wilfred B. Mathewson
by Heard Smith & Tennant.
Attys.

Patented July 21, 1936

2,048,348

UNITED STATES PATENT OFFICE 2,048,348

MATTRESS-TUFTING MACHINE

Wilfred B. Mathewson, North Weymouth, Mass., assignor to United Mattress Machinery Company, Quincy, Mass., a corporation of Maine Application February 14, 1934, Serial No. 711,173

43 Claims. (Cl. 112—3)

This invention relates to a machine for tufting mattresses and the like and has for one of its objects to provide a novel mattress-tufting machine which is constructed to perform the tufting operation by attaching tufting buttons or similar tufting elements to the tufting cord on opposite sides of the mattress.

Another object of the invention is to provide an improved mattress-tufting machine, which operates first to carry one end of a length of tufting cord through the mattress from one side to the other, then to tie a tufting button or a suitable tufting element to the end of the cord which has been thus carried through the mattress, and subsequently to tie a second tufting button to the cord on the opposite side of the mattress.

Other objects of the invention are to improve generally tufting machines in various particulars as set forth in the following description.

In the drawings wherein I have illustrated a selected embodiment of the invention.

Figure 27:
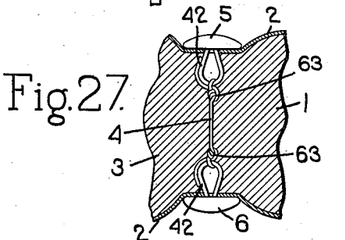
Fig. 27 is a fragmentary sectional view through a portion of a mattress which has been tufted with the apparatus herein described.
Figure 28:
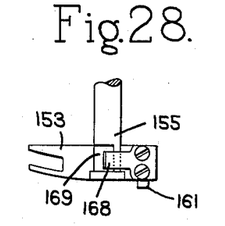
Fig. 28 is a side view of the button-transfer device.
Figure 29:
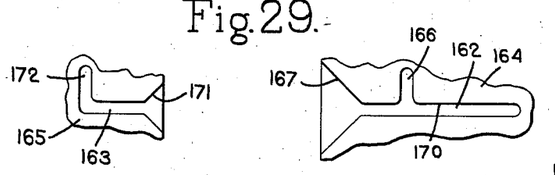
Fig. 29 is a fragmentary view showing the means for operating the button-transfer device.

Referring first to Fig. 27 which shows the result accomplished by the machine hereinafter to be described, and which is designed for tufting a mattress with a tufting element in the form of a tufting button, 1 indicates a portion of a mattress having the usual ticking 2 and mattress filling 3. At each point where a tuft is to be made a single length 4 of tufting cord extends through the mattress and one end of this tufting cord 4 is tied to the eye 42 of a tufting button 5 on one side of the mattress and the other end is tied to the eye 42 of a second tufting button 6 on the other side of the mattress.

The machine herein described operates first to insert a length 4 of cord through the mattress and then to tie the button 5 to one end of the cord on one side of the mattress and subsequently to tie the other button 6 to the other end of the cord on the opposite side of the mattress.

The machine is also provided with means to compress the mattress at the points where the tufting buttons are tied into it and the tying is done in such a way that the total length of the cord 4 between the buttons tied to it is less than the normal thickness of the mattress so that the mattress will be compressed somewhat and the surface thereof will be indented at the point where the buttons are located as seen in Fig. 27.

Before describing the machine in detail I will refer to Figs. 23 to 26 which show diagrammatically the successive steps in inserting the tufting cord through the mattress and tying the buttons thereto. The tufting cord is inserted through the mattress through the medium of a tufting needle 7 which is herein shown as movable upwardly through the mattress, and the mattress is compressed at the point where each tuft is to be made by means of a mattress-compressing member 8.

Figures 22, 23, 24:
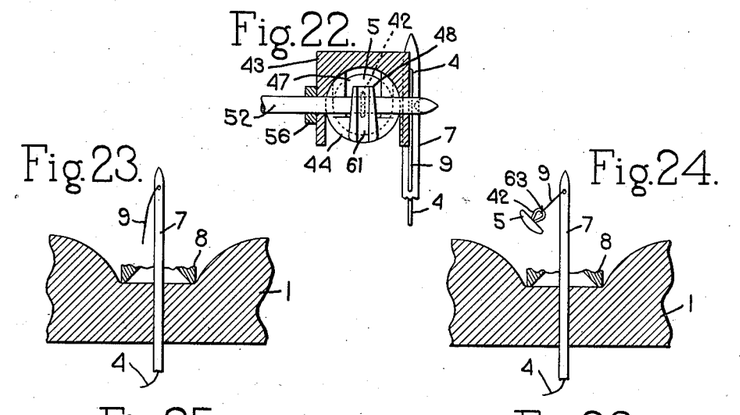
Fig. 22 is a section on substantially the line 22—22, Fig. 14.
Figs. 23 to 26 are diagrammatic views illustrating the various steps in the operation of tufting a mattress.

When the mattress-compressing member has been forced downwardly against the mattress to compress the latter as shown in Fig. 23 then the needle 7 is inserted upwardly through the mattress to a point above the compressing member thereby to carry the tufting cord 4 through the mattress. The button 5 is then tied to the end 9 of the tufting cord 4 as shown in Fig. 24, and after this is done the needle is withdrawn thereby bringing the tufting button 5 down against the mattress at the point where it is compressed (see Fig. 25). The tufting cord is then cut between the mattress and the needle by a suitable knife 210 and the second button 6 is tied to the lower end of the length 4 of tufting cord which is left in the mattress, thereby completing the tufting operation. Both buttons are tied to the cord 4 while the mattress is still compressed by the mattress-compressing member 8, and after the button-tying operation is completed the mattress-compressing member is raised and the mattress expands as far as the buttons and cord will allow.

When the tufting operation is completed the shanks or eyes 42 of the button will penetrate the ticking of the mattress at the points where the needle 7 was inserted therethrough and, therefore, the buttons lie flatly against the face of the ticking.

The devices for performing these operations are mounted on a suitable frame 10 which is provided with a bed portion 11 that carries a lower button-tying element, indicated generally at 12, by which the button 6 is tied to the tufting cord 4. The frame also is formed with the overhanging arm 13 which carries not only the mattress-compressing member 8 but also an upper button-tying device 14 by which the button 5 is tied to the cord.

The mattress 1 in which the tufts are to be inserted is supported on a mattress-supporting table or platform 15 which is shown as mounted on supporting rails 16 for movement transversely of the machine. The mattress can be shifted on the platform 15 to bring different portions thereof into position to have a tuft formed therein.

The tufting needle 7 is shown as mounted on a vertically-reciprocating needle carrier 17 which is guided by suitable guides 18 secured to the base 11 of the frame. The needle is given its reciprocating motion by a cam groove 19 formed in a cam element 20 that is fast on a shaft 21 journalled in the frame. The cam 19 is connected to the needle carrier through the medium of a lever 22 pivoted to the frame at 23. Said lever has a follower 291 operating in the cam groove 19, and is connected to the needle carrier 17 by means of a link 292. The lever illustrated has the construction shown in my Patent No. 1,894,409, January 17, 1933.

Figure 5:
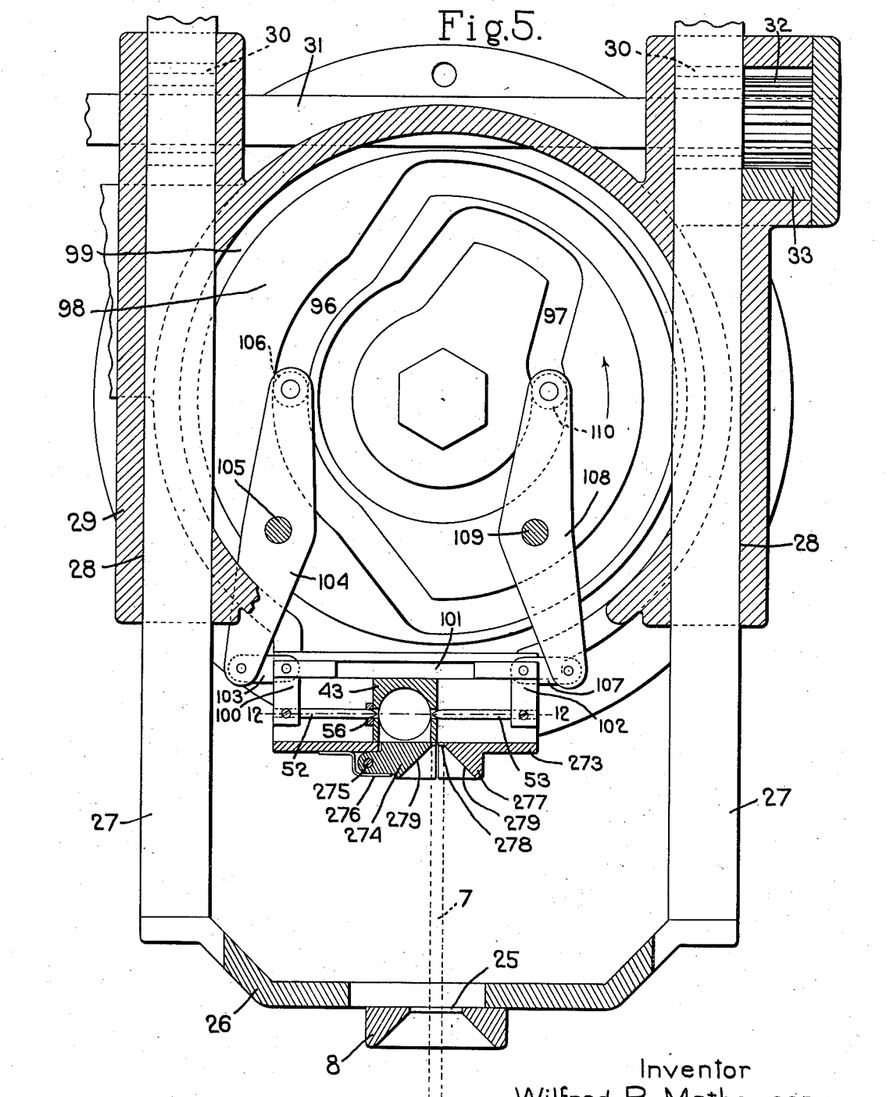
Fig. 5 is a section on the line 5—5, Fig. 2 with parts broken out.

The mattress-compressing member 8 is mounted for vertical movement in the frame 13. It is shown as having a central opening 25 (see Fig. 5) through which the needle 7 may pass and it is carried by a yoke member 26 secured to the lower end of two vertical racks 27 which are vertically movable in suitable guideways 28 formed in the head 29 secured to the end of the arm 13.

Figure 1:
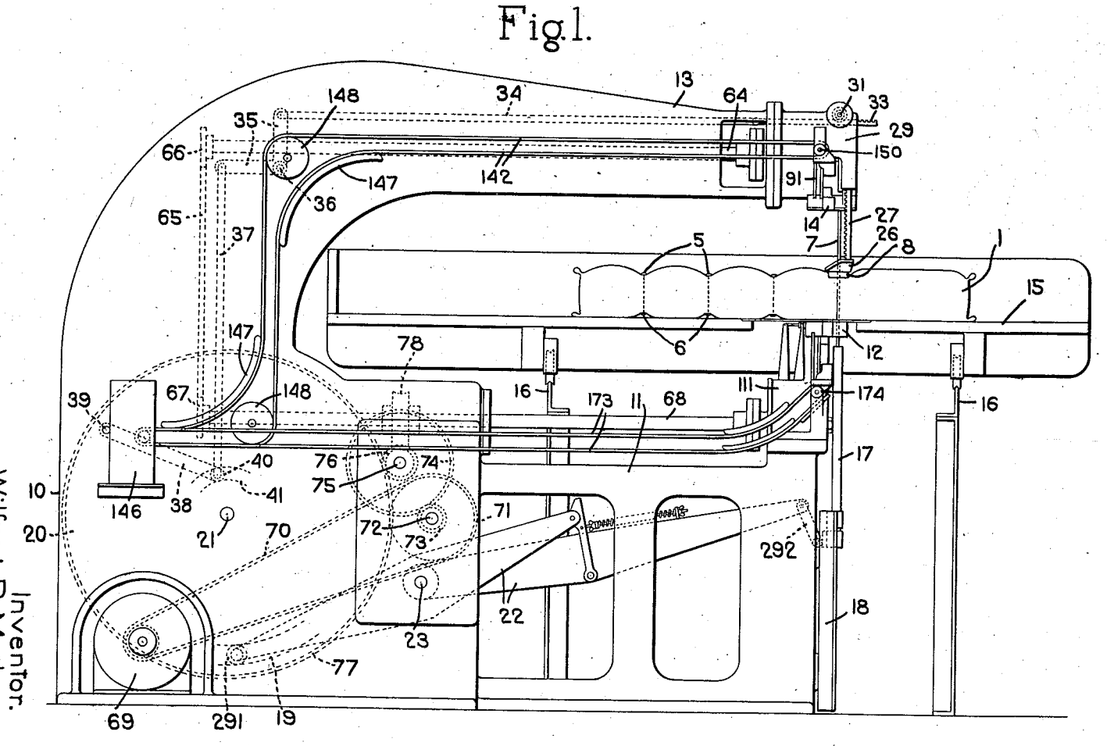
Fig. 1 is a side view of a button-tufting machine embodying the invention.

The racks 27 mesh with pinions 30 fast on a shaft 31 journalled in the head 29 and said shaft has another pinion 32 thereon which meshes with a horizontally-extending rack 33 that is mounted in the head 29 for horizontal reciprocation. This rack 33 is connected by a link 34 (see Fig. 1) to one arm of a bell crank lever 35 pivoted to the frame at 36 and the other arm of the bell crank lever is connected by a link 37 to a lever 38 pivoted to the frame at 39. The lever 38 has a follower 40 operating in a cam groove 41 formed in the cam member 20. The cam groove 40 oscillates the lever 38 about its pivot 39 and the vibrating movement of the lever is transmitted to the rack 33 and thus to the mattress-compressing member 8 through the connections above described.

The tying of each button to the end of the cord 4 involves first inserting the end of the cord through the eye 42 of the button and then forming a loop in the portion of the cord which extends through said eye and subsequently drawing the end of the cord through said loop and tightening the latter. These operations are performed by a button-tying device illustrated in Figs. 4 and 12 to 21 inclusive which will now be described. As stated above there are two button-tying devices, an upper tying device 14 situated above the mattress and operating to tie the button 5 to the cord 4, and a lower button-tying device 12 operating beneath the mattress and functioning to tie the button 6 to the cord 4. The two button-tying devices have the same construction so that a description of one will suffice. Figs. 12 to 21 are sectional views of the upper button-tying member 14. Each button-tying device is made with a housing 43 in which is received a button-holding and loop-forming member 44, the latter being formed with a button-receiving recess 45 to receive the button (button 5 in the button-tying member 14), one wall 46 of the recess constituting a seat against which the back of the button 5 may be supported.

The button-holding member is formed with an opening 47 through which the eye 42 of the button extends and also a loop-forming nose 48 against which the end of the eye of the button rests, said nose preferably being formed with a groove 49 to receive and aid in positioning the eye. The button is retained in this position against the seat 46 by means of a clamping member 50 which extends axially of the button-holding member 44 and is movable in the direction of its axis to clamp and unclamp the button. The button-holding and loop-forming member 44 is mounted to move within the housing 43 in the direction of its axis and also to rotate about its axis, both of these movements taking place during the button-tying operation.

The means for giving the member 44 its axial rotative movement and the clamping member 50 its axial movement will be presently described.

The housing 43 of the upper button-tying member 14 is situated so that when said needle 7 is in its elevated position it is situated adjacent the housing 43 and occupies a groove 51 formed in the side of the housing 43. The raising of the needle into this position brings the end 9 of the tufting cord 4 carried by the needle into a position adjacent the button-tying device as seen in Fig. 22.

For threading the cord 4 through the eye 42 of the button and tying the cord to the button there are provided two cord-manipulating hooks 52 and 53 which are normally situated at opposite sides of the housing 43 and are movable transversely across the housing. Before describing the means for operating these thread-manipulating hooks I will refer to the manner in which they function to tie the button to the cord as illustrated in Figs. 12 to 22.

Figures 12, 14:
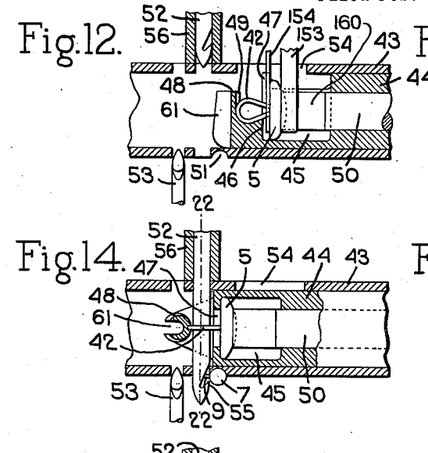
Figs. 12 to 21 are fragmentary sectional views of the upper button-tying device showing the various steps in the operation of tying the button to the end of the tufting cord, said views being taken on substantially the line 12—12, Fig. 5.
Figure 13:
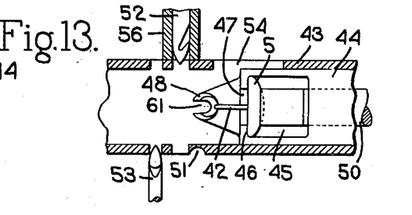
Figure 15:
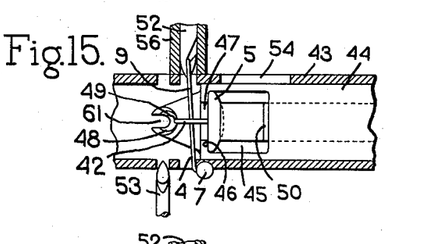
Figure 16:
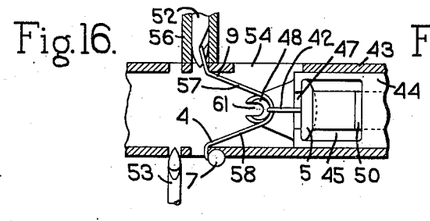
Figure 17:
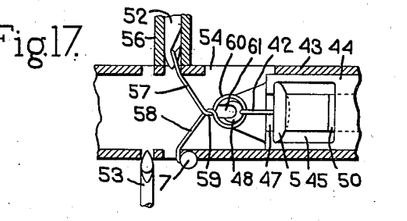

Fig. 12 shows a button retained by the button-holding member 44 with its eye supported by the nose 48, said button having been introduced into the holder through the open side 54 of the housing by means which will be presently described. When the button is delivered to the button-holding member 44 the clamping member 50 is withdrawn or in its backward position, and after the button has been delivered the clamping member 50 moves forwardly to clamp the button in position against the face 46. After the button has been delivered the member 44 is rotated through a quarter revolution so as to bring the eye 42 of the button in a plane at right angles to the movement of the cord-manipulating hooks 52, 53 as shown in Fig. 13. The button-holding member 44 then moves forwardly into the position shown in Fig. 14 to bring the eye 42 in line with the hook 52, and said hook is advanced through the eye and past the tufting needle 7, as shown in Figs. 14 and 22. Said hook is then withdrawn from the button eye 42 and returned to its initial position while the needle is still raised. During its return movement the hook 55 engages the end 9 of the cord 4 which has been presented by the needle 7 and pulls said end through the eye 42 of the button as seen in Fig. 15.

The hook 52 operates through a guiding tube 56 and as the hook portion 55 enters the tube 56 the end 9 of the cord 4 will be clamped between the hook and the inner face of the tube and thus held in position. After the end 9 of the cord 4 has thus been drawn through the eye 42, the button-holding member 44 is retracted into the position shown in Fig. 16, and during this operation the nose 48 engages said end 9 of the cord 4 and pulls a length thereof from the needle 7, said length being given the U shape shown in said Fig. 16 and having the two legs 57, 58. The button-holding member is then rotated about its axis to twist together the two legs 57, 58 of the loop of cord as shown at 59 and form therein a closed loop 60 which is threaded through the eye 42 of the button and which encircles the nose 48. This rotative movement of the button-holding member is stopped when the latter occupies the angular position shown in Fig. 18, that is, with the nose 48 extending parallel to the cord-manipulating hooks 52, 53.

Figure 18:
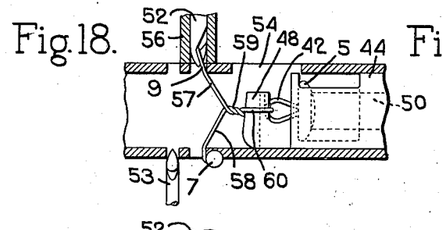
Figure 19:
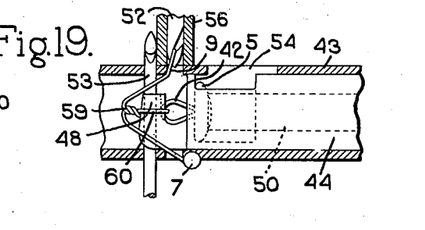
Figure 20:
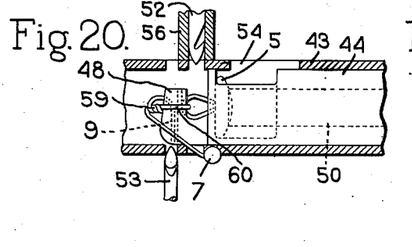
Figure 21:
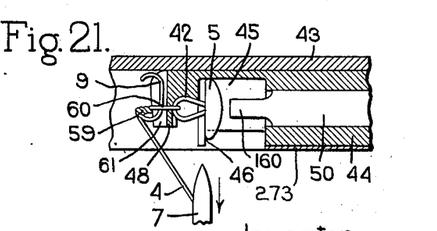

I will preferably rotate the button-holding member 43 throughout two complete revolutions and then an additional part revolution to bring it into the position shown in Fig. 18. The button-holding member is then advanced into the position shown in Fig. 19 to bring the loop 60 which has been formed in the cord into line with the thread-manipulating hook 53. The nose 48 is formed with a hook-receiving groove or passage 61 and when the button-holding member is in the position shown in Fig. 19 this passage 61 is in line with the hook 53. Said hook 53 is then advanced through the passage as shown in Fig. 19, which movement carries it through the loop 60 which has been formed in the cord 4 and into a position in which the hooked end of said hook has been carried beyond the portion 57 of the cord which extends from the twist 59 to the hook 52. The hook 53 is then retracted and during its retractive movement the hooked portion thereof engages the portion 57 of the cord and pulls it loose from the hook 52 and also draws it through the passage 61 and hence through the loop 60 as shown in Fig. 20. The button-holding member is then retracted slightly and given a reverse rotation into a position in which the nose faces downwardly and the button-clamping member is moved back slightly to unclamp the button as shown in Fig. 21. The needle 7 is then withdrawn and the tension applied to the tufting cord through the portion 58 thereof pulls the loop 60 off from the end of the nose 48 and tightens the loop to form the knot 63 by which the button 5 is tied to the tufting cord 4.

Figure 25:
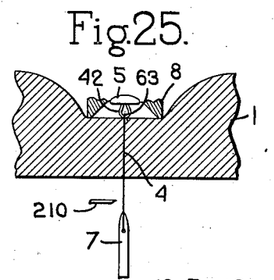
Figure 26:
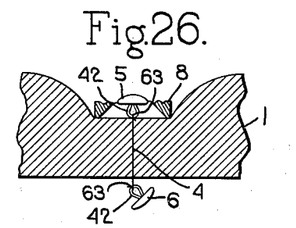

The downward or withdrawing movement of the needle 7 withdraws it entirely from the mattress as shown in Fig. 25 and such withdrawing movement not only tightens the knot at the loop 42 of the button but also pulls the button out of the upper knot-tying device and down against the upper face of the mattress. The housing 43 of the upper knot-tying device 14 is formed with an open bottom which is closed by a plate 273. This plate is provided with an opening directly under the portion of the housing 43 at which the knot-tying occurs and such opening is normally closed by a pivoted door member 274, said member being pivoted to the plate 273 at 275 and being normally held in raised position by a spring 276. The plate 273 is also provided with a needle-guiding portion for guiding the needle 7 in its upward movement so as to ensure that such needle 7 will correctly enter the groove 51 when it is in raised position. For this purpose the plate 273 is formed with a thickened portion 277 opposite the door 274 which is also thickened somewhat and said door and thickened portion 277 are shaped to form between them a needle-guiding opening 278 through which the needle 7 extends and which is provided with the downwardly- and outwardly-inclined walls 279. These walls form guiding walls to guide the needle 7 accurately into the opening 278 in case the needle is deflected from its true course during its upward movement and by this means the needle will always be caused to be correctly positioned in the groove 51.

When the needle is retracted and withdrawn from the mattress as shown in Fig. 25 thereby to pull the loop 60 off from the nose 48 and to tighten the knot 63 the tension on the thread 4 will pull the button out from the button-holding member 44 and against the door 274 and the latter will then swing downwardly to allow the button to be pulled entirely free from the upper knot-tying device 14.

The means for giving the movement to the button-holding member 44 and the clamp 50 and to the thread-manipulating hooks 52, 53 is contained in the head 29 and is operated from a shaft 64 which extends longitudinally of the arm 13 and which is driven through a sprocket chain 65 and sprocket wheels 66 and 67 from a shaft 68 mounted in the bed of the frame. The shaft 68 is in turn driven from the driving means for the cam 20. Said driving means is herein shown as a motor 69 which is connected by a driving belt 70 with a pulley 71 on a shaft 72. This shaft 72 has a pinion 73 thereon meshing with a gear 74 on a second shaft 75 and said second shaft has a pinion 76 thereon meshing with gear teeth 77 on the periphery of the cam member 20. The shaft 74 also has a worm gear thereon meshing with a worm 78 fast on the shaft 68.

The motion in an axial direction of the button-holding member 44 and the clamping member 50 is derived from two cam grooves 79, 80 formed in a cam member 81 which is located within the head 29 and fast on the shaft 64. The end of the button-clamping member 50 is pivotally connected at 810 to the lower end of a lever 82 which in turn is pivoted at 83 to the head 29, the upper end of said lever having a follower 840 operating in the cam groove 80. This cam groove 80 is shaped to give the button-clamping member 50 its necessary movements in an axial direction.

The button-holding member 44 extends beyond the housing 43 and is provided with a groove 84 in which is received the forked end 85 of a lever 86 pivoted at 87 to the head 29 and provided with a follower 88 operating in the cam groove 79. Said groove 79 has the proper shape to give the member 44 its required movement in an axial direction.

In order to give the button-holding member its rotary movement it has long gear teeth 89 cut in its periphery which mesh with teeth 90 formed on a sector gear 91 which is pivoted to the head 29 at 92, and is provided with a follower 93 operating in a cam groove formed in the face 94 of a cam element 95 which is fast on the shaft 64.

The hooks 52, 53 are actuated by cam grooves 96, 97 formed in the face 98 of the cam member 99 which is also fast on the shaft 64 and is located within the head 29. The hook 52 is secured to a head or slide 100 which is movable in transverse guideways 101 and the hook 53 is secured to a similar head 102 which is also movable transversely in said guideway 101. The head 100 is connected by a link 103 to a lever 104 pivoted at 105 to the head 29, the end of said lever having a follower 106 which operates in the cam groove 96. The head 102 for the hook 53 is connected by a link 107 to the lower end of a lever 108 which is also pivoted to the head 29 at 109 and has at its upper end a follower 110 operating in the cam groove 97. These cam grooves are designed so as to give the hooks 52, 53 the sequence of movements above referred to and shown in Figs. 12 to 22.

The above description refers to the cam mechanism for actuating the upper button-tying device 14. As stated above the construction of the lower button-tying device 12 is similar to that shown in Figs. 12 to 20 but the means for giving movement to the parts are located in a lower head 111 carried on the base 11 of the frame 10, and are actuated by the shaft 68. This lower head 111 contains a cam member 112 having two cam grooves 113 and 114 by which the button-holding member and button-clamping member of the lower button-tying device 12 are given their movement in an axial direction. The cam groove 113 receives a follower 115 on the end of a lever 116 pivoted at 117 to the lower head 111, the upper end of said lever 117 being forked as shown at 118 and being received in a groove 84 of the lower button-holding member 44.

The lower button-clamping member 50 is connected to the upper end of a lever 119 pivoted at 120 to the head 111 and has at its lower end a follower 121 operating in the groove 114.

Figure 11:
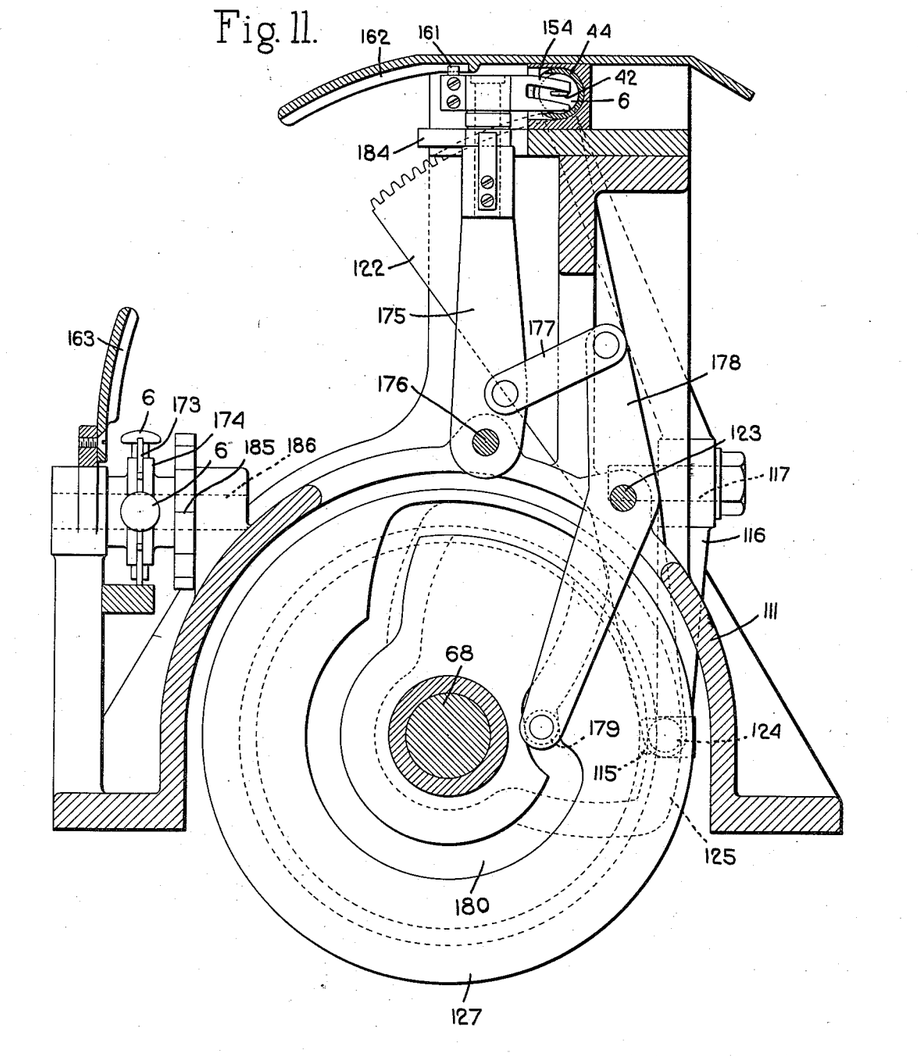
Fig. 11 is a section on the line 11—11, Fig. 8.

The gear sector for rotating the lower button-holding member 44 is shown at 122 (see Fig. 11) and it is pivotally mounted on a stud 123 carried by the head 111 and has at its end a follower 124 operating in a cam groove 125 formed in the face 126 of the cam element 127, the latter being fast on the shaft 68.

The hooks 52, 53 of the lower button-tying device are mounted on heads 128, 129 which are operated in a guideway 130. The head 128 is connected by a link 131 to the upper end of a lever 132 pivoted at 133 to the head 111, the lower end of said lever having a follower 134 operating in a cam groove 135 formed in the face of a cam element 136 fast on the shaft 68. The head 129 for the hook 53 is connected by a link 137 to the upper end of a lever 138 which is pivoted at 139 to the head 111 and is provided at its lower end with a follower 140 operating in a cam groove 141 formed in the cam element 136.

The upper and under button-tying devices 14 and 12 operate alternately. While the upper button-tying device is tying the upper button 5 to the end 9 of the cord 4 the under button-tying device is inactive. After the upper button 5 has been tied in the manner above described and the needle 7 has been withdrawn from the mattress then the under button-tying device 12 operates to tie the under button 6 to the cord 4, during which time the upper button-tying device remains idle.

Figure 10:
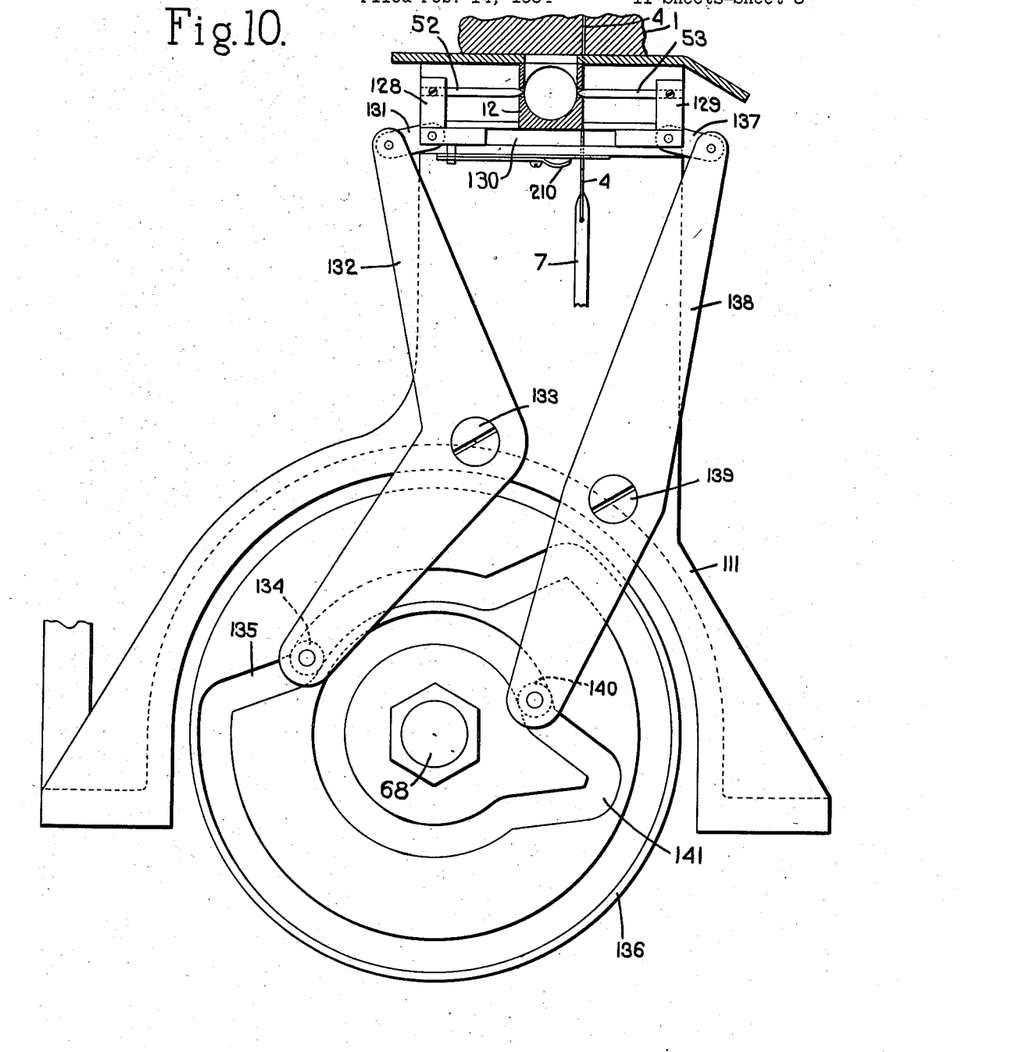
Fig. 10 is a section on the line 10—10, Fig. 9.

It will be understood that when the lower or under button-tying device 12 functions the needle 7 has been withdrawn from the mattress and a length of the cord 4 extends from the needle to the mattress as shown in Fig. 10. The operation of the under button-tying device 12 is similar to that of the upper button-tying device 14. Said lower button-tying device, however, has a cutter associated therewith which operates to cut the length of cord 4 extending from the needle to the mattress before the button-tying begins. This cutter is indicated at 210 and is in the form of a blade carried by the head 128.

After a button 6 has been delivered to the under button-tying element 12, the hook 52 is advanced through the eye of the button in the manner shown in Fig. 14 and during this advancing movement of the head 128 which carries the hook through the eye of the button, the knife 210 acts on the cord extending from the needle to the mattress and cuts the latter. As the hook 52 of the lower button-tying device is retracted it pulls the end of the cord 4 through the eye 42 of the button 6 in the manner shown in Fig. 15. After this the button-holding device is retracted and turned in the manner shown in Figs. 16, 17 and 18 and then the hook 53 is advanced through the passage 61 of the nose 48 in the manner shown in Fig. 19 thereby engaging the end of the cord and pulling it through the loop in the manner shown in Fig. 20. The button-holding member is then turned so that the nose 48 will be pointed upwardly. The mattress-compressing member 8 is then raised from the mattress and the expanding action of the mattress will draw the loop 60 of the cord off from the nose 48 of the lower button-tying device, thereby tightening the knot.

By the means above described two buttons 5 and 6, one on each side of the mattress, are tied to the opposite ends of a single length of cord 4 which extends through the mattress and either during the button-tying operation or during the expansion of the mattress after the mattress is released by the mattress-compressing member 8, the shanks or eyes 42 of the buttons will be drawn through the ticking 2 at the holes made by the needle 7 so that the back faces of the buttons will rest against the outer surface of the ticking.

Reference has been made above to means for feeding buttons to the button-holding member 44.

The device herein shown includes a button-feeding device comprising means for feeding buttons forward, and a button-transferring element to transfer the buttons singly from the button-feeding means to the button-holding means. The button-feeding means is in the form of an endless conveyer and the button-transferring element takes buttons from the conveyer and transfers them to the button-holding means in timed relation with the operation of the button-tying device. There is a button-feeding means of this type for each of the button-tying devices 12 and 14.

The button-feeding means for the upper button-tying device 14 comprises the endless chain member 142 which is made up of the button-holding links 143 pivotally connected by plain links 144. Each button-holding link has the two button-holding fingers 145 and the construction is such that the button-holding fingers 145 of adjacent links 144 co-operate to grip a button as shown best in Fig. 2. Each button is held in the button-feeding means with the loop 42 thereof directed inwardly.

Figure 2:
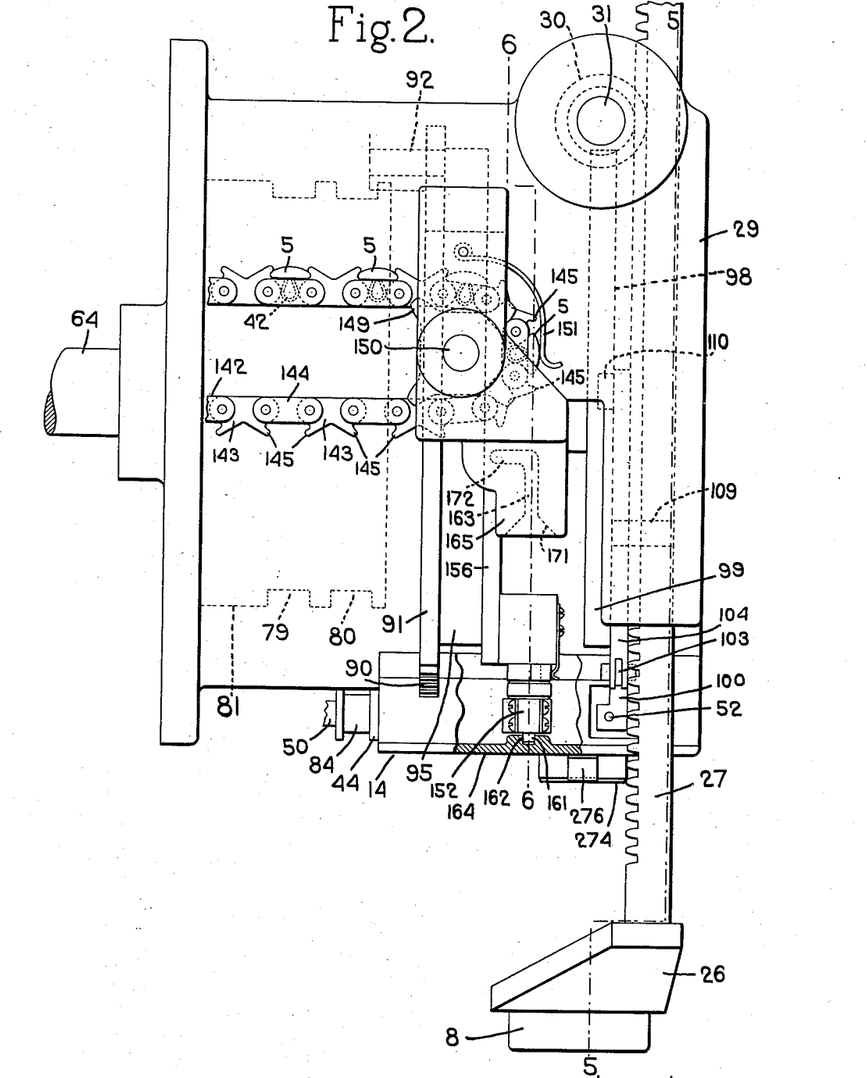
Fig. 2 is a fragmentary detail of the upper button tying device and the mattress-compressing member.

Buttons may be supplied to the endless conveyer 142 from a suitable magazine 146, the endless button-feeding means 142 extending into the magazine to receive the buttons. The upper run of the endless carrier 142 will be loaded with buttons which are conveyed into positions to be transferred to the upper button-tying device. As herein shown the endless carrier 142 is guided by suitable guides 147 and guide rails 148, and at the delivery end of the feeding means said carrier runs over a sprocket 149 carried by a shaft 150. As each pair of adjacent button-holding links 143 pass around this sprocket 149 the button-holding fingers 145 which are holding any button become separated as shown in Fig. 2 so that the button is free to be removed by the button transfer device, the button being retained in this position until it is transferred by the spring finger 151.

Figure 6:
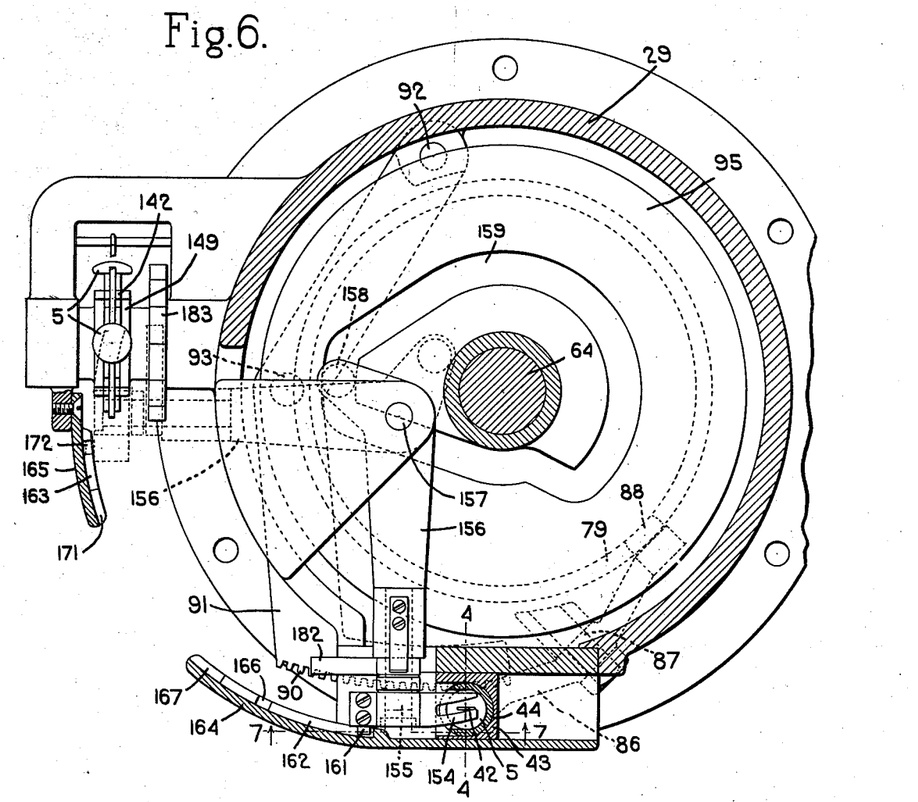
Fig. 6 is a section on the line 6—6, Fig. 2 showing the means for transferring buttons from the button-feeding device to the button-tying device.
Figure 7:
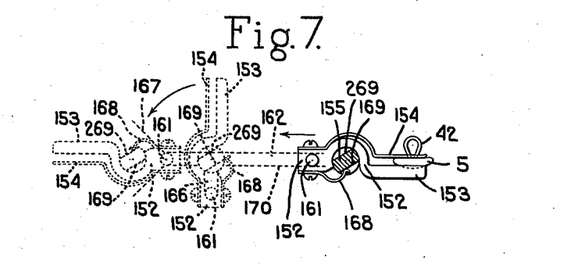
Fig. 7 is a section on the line 7—7, Fig. 6, said figure showing in dotted lines the operation of the button-transferring member.
Figure 8:
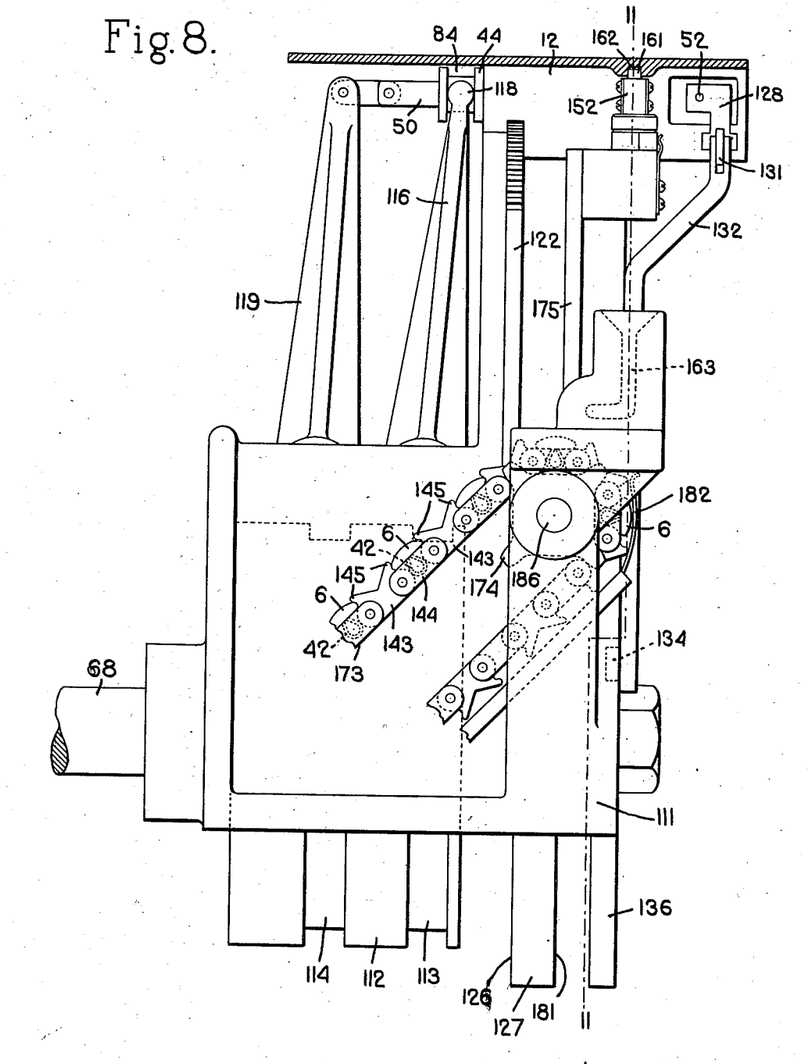
Fig. 8 is a fragmentary view illustrating the lower button-tying member and part of the button-feeding means therefor.
Figure 9:
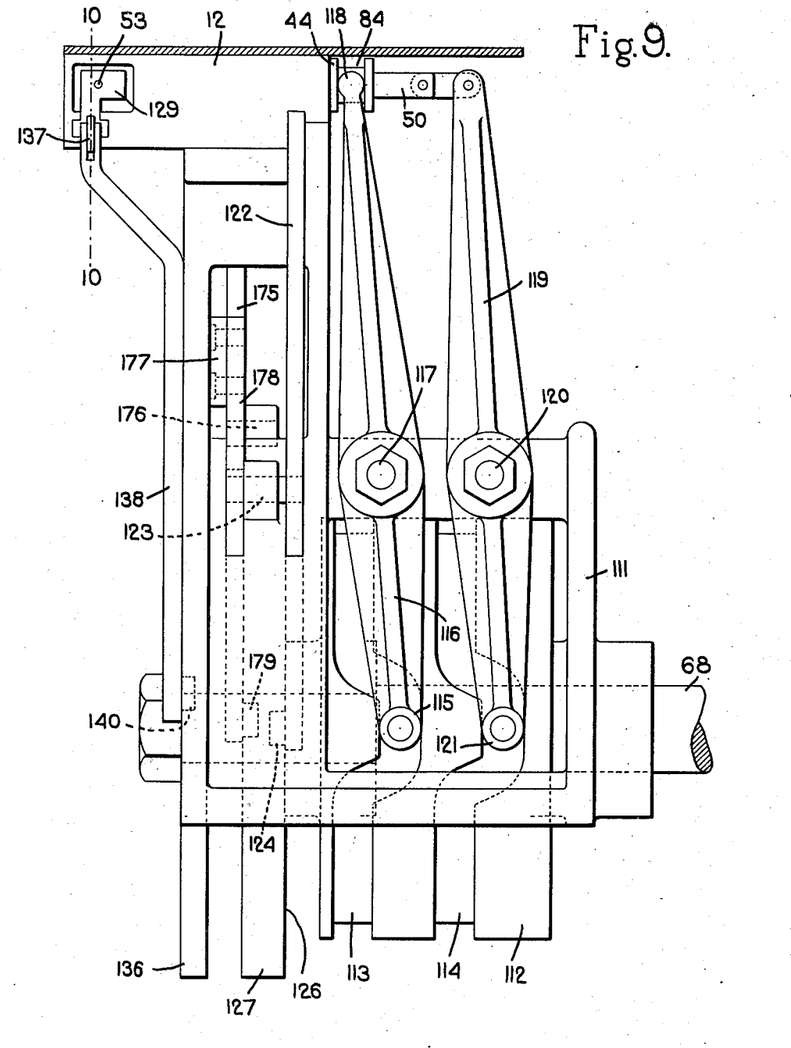
Fig. 9 shows the lower button-tying member viewed from the opposite side from that shown in Fig. 8.

The button-transferring device is shown in Figs. 6 and 7 and it comprises a button-gripping member 152 mounted for movement between the delivery end of the endless carrier 142 and the button-holding member 44. This button-gripping member is forked at one end to present two button-gripping fingers 153 adapted to engage the face of the button and it has two spring fingers 154 adapted to engage the back side of the button, the loop 42 of the button extending between the fingers 154. This button-gripping device is rotatively mounted on the end 155 of a lever 156 pivoted to the head 29 at 157, said lever having a follower 158 operating in a cam groove 159 formed in the cam element 95.

The button-gripping member is shown in full lines in Fig. 6 in the position it occupies when it is delivering a button to the button-holding member 44.

The cam 159 swings the arm 156 from the full to the dotted line position in Fig. 6 and as the arm 156 swings into the dotted line position the button-gripping member is withdrawn from the button which is then gripped by the button-holding member 44, and during its movement from the full to the dotted line position said button-gripping member is given a 180° rotation about the end 155 of the arm 156.

As the button-gripping member reaches the dotted line position Fig. 6 the fingers 153 and 154 are directed upwardly, and the spring fingers 154 pass behind the button at the end of the button carrier 142 which is retained in position by the spring 151, while the fingers 153 pass in front of said button. When the arm 156 is given a reverse movement back into the full line position, the button at the end of the button-feeding means is picked off from the button-feeding means by the button-gripping member 152 and during the movement into the full line position said button-gripping means is rotated through 180° to bring it into the position shown in full lines Fig. 6, in which position it presents the button to the button-holding member as shown in Fig. 12. It will be understood that when the button is thus presented to the button-holding member the button-clamping element 50 is retracted, but as soon as the button has been placed in position the button-clamping member is moved forwardly to clamp the button.

Figures 3, 4:
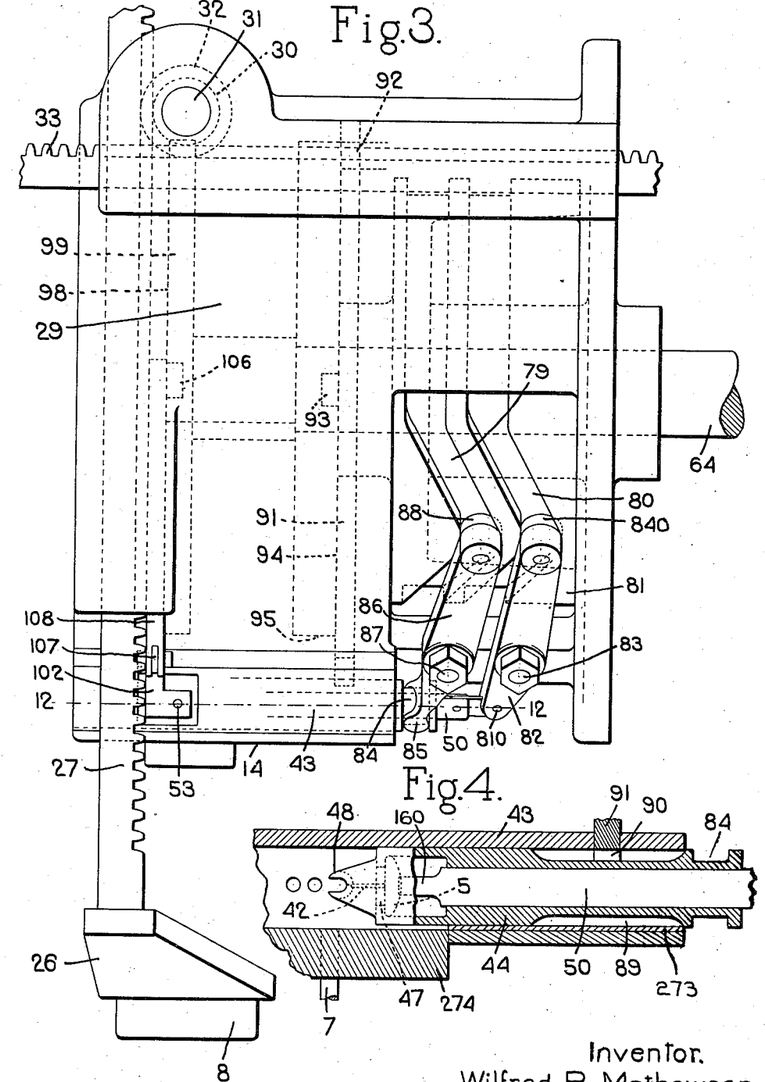
Fig. 3 is a view of said upper button-tying device and mattress-compressing member showing the opposite side from that shown in Fig. 2.
Fig. 4 is a sectional view of the button-tying device on substantially the line 4—4, Fig. 6.

The button-engaging end 160 of the button-clamping member 50 has a reduced transverse dimension in one direction as best seen in Figs. 4 and 21, and when it is moved forward to clamp the button said end 160 enters between the fingers 153 as indicated in Fig. 12.

The means for giving the button-gripping member 152 its rotative movement on the end 155 of the lever 156 comprises a pin 161 extending from said button-gripping member and operating in grooves 162, 163 formed in portions 164 and 165 of the head 29. The groove 162 is provided with the lateral branch 166 and said groove has a divergent open end 167. The button-gripping member 152 is acted on by a spring 168 which tends to turn it slightly in a counter-clockwise direction when it is in the full line position shown in Figs. 6 and 7. This spring 168 is in the form of a leaf spring anchored at one end to the button-gripping member and having the other end bearing against an inclined face 169 with which the end 155 of the arm 156 is provided. During the initial movement of the button-gripping member toward the left in Figs. 6 and 7 the pin 161 is at the leading end of said member and the spring 168 will tend to force the pin 161 against the wall 170 of the groove 162. When said pin reaches the lateral branch 166 of the groove said spring will throw the pin into said branch. As the arm 156 continues its rotation the engagement of the pin 161 in the branch groove 166 will turn the button-gripping member about the end 155 of the lever 156 through an angle of 180° as shown by the two dotted line positions in Fig. 7, and when the button-gripping member has been turned into the left hand dotted line position the pin 161 is on the trailing end of the button-gripping member and is in the main portion of the groove 162. As the arm 156 continues its movement toward the dotted line position Fig. 6, the pin 161 will pass out of the open end 167 of the groove 162. The button-gripping member is thus reversed in position before it leaves the groove 162.

The groove 163 has the divergent open end 171 and it has the offset or angular portion 172. As the arm 156 moves toward the dotted line position Fig. 6 the pin 161 of the button-gripping member, which is at this time on the trailing end of said member, will enter the divergent end 171 of the groove 163 and said groove and pin will hold the button-gripping member in position with the fingers 153 and 154 at the leading end so that when said member reaches the upper limit of its movement it is properly located to engage the button at the end of the endless carrier 142 which is then being retained in position by the spring 151 (see Fig. 2).

The end 155 of the lever 156 is provided with a second flat surface 269 with which the spring 168 comes into engagement when the button-gripping member has been turned into the dotted line position at the left in Fig. 7. The action of the spring against this flattened face 269 tends to press the pin 161 against the wall of the slot 163 and when the arm 156 has made its complete upward movement the pin 161 is located opposite the lateral portion 172 of the slot. The biasing action of the spring 169 throws the pin 161 slightly into the slot 172 and when the arm 156 begins its return movement the engagement of the pin 161 in the offset portion 172 of the slot 163 causes a reversal of the position of the button-gripping member 152 and swings it into a position so that the button-holding fingers 153 and 154 are directed toward the button-holding member 44. As the arm 156 moves into the full line position Fig. 6 the button carried by the button-gripping member will be delivered to the button-holding member 44 as above described.

The button-feeding means for the lower button-tying element 12 is similar to that above described. It comprises an endless chain carrier 173 which extends from the magazine 146 around a sprocket 174 at the delivery end of the carrier. As the links carrying the buttons pass around the sprocket 174 the gripping action on each button by the fingers 145 is released and the button is transferred to the lower button-holding member by a button-gripping device 154 which is similar in all respects to the button-gripping device 152.

The button-transferring element 154 is mounted on a lever 175 pivoted at 176 and this lever is connected by a link 177 to a cam-actuated lever 178 mounted on the stud 123 and provided with a follower 179 operating in a cam groove 180 formed in the cam face 181 of the cam element 127.

Means are provided for feeding the endless chain devices 142 and 173 forwardly with a step by step movement so that at each operation of either of the button-transferring devices a button will be properly presented by the corresponding endless chain. In the construction herein shown the feeding movement of the endless chains is secured by the oscillating movement of the arms 156, 175. The arm 156 which operates the upper button-transferring member is provided with a pawl 182 which is adapted to co-operate with a ratchet wheel 183 fast on the shaft 150 which carries the sprocket wheel 149. This pawl 182 is a hook pawl and each time that the arm 156 swings into the dotted line position in Fig. 6 the pawl will wipe over one of the teeth of the ratchet wheel 183 and during the initial downward movement of the arm 156 from its dotted line position to the full line position in Fig. 6 the shaft 150 will be given a sufficient turning movement to bring another button into position to be taken by the button-transferring member on its next operation. For actuating the lower sprocket chain 173 a similar pawl 184 is carried by the swinging arm 175, said pawl co-operating with a sprocket 185 which is fast on the shaft 186 that carries the sprocket wheel 174. By the term "single length of cord" as used in the above description and in the claims, I refer to a length of cord having two free ends to each of which a tufting element is tied. Such length of cord may be a single-ply length or a plural-ply length, the term "single length" being intended to cover a length of cord having free ends whether it is a single-ply or a plural-ply length.

While I have illustrated the invention as applied to the tying of tufting buttons to the ends of the single length of cord, whether the latter is a single-ply length or a plural-ply length, yet the invention is not necessarily limited to the tying of buttons to the length of cord as it may be used for tying other tufting elements in the nature of buttons.

While I have illustrated herein one embodiment of the invention yet it will be understood that the various changes in the construction may be made without departing from the invention as expressed in the appended claims.

I claim:

1. In a mattress-tufting machine, the combination with means to pass one end of a length of cord through a mattress, of a button-tying device having means to insert the end of a cord through the eye of a button and to tie said button to said cord and other button-tying means to tie a second button to said cord on the side of the mattress opposite to that on which the first button is located.

2. In a mattress-tufting machine, the combination with means to pass the end of a length of cord through a mattress, of a button-tying device having means to insert the end of a cord through the eye of a button and to tie said button to said cord, means to draw said button against the side of the mattress, and a second button-tying means to tie a second button to said cord on the opposite side of the mattress.

3. In a mattress-tufting machine, the combination with means to compress a mattress, means to pass the end of a length of cord through the mattress at the point where it is compressed, a button-tying device having means to insert the end of said cord through the eye of a button and to tie said button to said cord, and a second button-tying means to tie a second button to said cord on the opposite side of the mattress from that on which the first-named button is located.

4. In a mattress-tufting machine, the combination with means to pass the end of a length of cord through the mattress from one side to the opposite side, button-tying means to tie a button to said end of the cord on said opposite side of the mattress, a second button-tying means to tie a second button to said cord on the first-named side of the mattress and means to operate said two mutton-tying means successively.

5. In a mattress-tufting machine, the combination with means to pass one end of a length of cord through a mattress from one side thereof to the opposite side, button-presenting means to place a button in position to be tied to said end of the cord, button-tying means to tie the button to the cord end, and means to tie a second button to said cord on the side of the mattress at which the cord entered the mattress.

6. In a mattress tufting machine, the combination with means to pass a length of cord through a mattress with the cord projecting from each face of the mattress, of button-tying device to tie a button having an eye to the single length of cord on each side of the mattress, each button-tying device having means to insert a cord end through the eye of a button and to form a knot in the cord to tie said button thereto.

7. In a mattress-tufting machine, the combination with means to compress a mattress, of means to pass one end of a length of cord through the mattress at the point where it is compressed, button-presenting means to place a button in position to be tied to said cord end on one side of the mattress, button-tying means to tie to the cord end the button thus presented, a second button-presenting means to place a second button in position to be tied to the cord on the opposite side of the mattress, and a second button-tying device to tie said second button to said cord.

8. In a mattress-tufting machine, the combination with means to pass one end of a continuous length of cord through a mattress from one side to the opposite side, a button-tying device having means to insert the cord through the eye of a button and to tie the button to the cord on said opposite side, means to cut the cord on the first side of the mattress thereby to leave a cut length of cord extending through the mattress, and a second button-tying device to tie a second button to said length of cord on the first-named side of the mattress.

9. In a mattress-tufting machine, the combination with means to compress a mattress, of means to pass one end of a continuous length of cord through a mattress from one side to the opposite side, a button-tying device to tie a button having an eye to the end of the cord on said opposite side, said button-tying device having means to insert the cord through said eye and tie the button to the cord, means to cut the cord on the first side of the mattress thereby to leave a cut length of cord extending through the mattress, and a second button-tying device to tie a second button to said length of cord on the first-named side of the mattress.

10. A button-tying device comprising button-holding means, means to pass an end of a length of cord through the eye of the button, means to rotate the button-holding means thereby to twist together the portions of the cord on either side of the eye and at the same time form a loop in the cord where it passes through said eye, and means to draw the end of the cord through such loop.

11. A button-tying device comprising button-holding means, means to pass an end of a length of cord through the eye of the button, means to rotate the button-holding means thereby to twist together the portions of the cord on either side of the eye and at the same time form a loop in the cord where it passes through said eye, and means to draw the end of the cord through such loop and tighten the loop.

12. A button-tying device comprising button-holding means, a hook for drawing an end of a length of cord through the eye of the button, means to rotate the button-holding means thereby to twist together the portions of the cord on either side of the eye and at the same time form a loop in the cord where it passes through said eye, and means to draw the end of the cord through such loop and tighten the latter.

13. A button-tying device comprising button-holding means, a hook for drawing an end of a length of cord through the eye of the button, means to rotate the button-holding means thereby to twist together the portions of the cord on either side of the eye and at the same time form a loop in the cord where it passes through said eye, a second hook to draw the end of the cord through such loop, and means to tighten the loop.

14. In a button-tying device, the combination with button-holding means, of means to deliver buttons singly thereto, means to pass one end of a length of cord through the eye of a button when retained by the button-holding means, means to rotate the button-holding means thereby to twist together the portion of the cord on either side of said eye and at the same time form a loop in the cord where it passes through the eye, and means to draw the end of the cord through said loop.

15. A button-tying device comprising button-holding means, means to deliver buttons singly thereto, a cord-manipulating hook to draw the end of a length of cord through the eye of a button when retained in the button-holding means, means to rotate the button-holding means thereby to twist together the portions of the cord on either side of the eye and at the same time to form a loop in the cord where it passes through the eye, and means to draw the end of the cord through such loop and tighten the loop.

16. A button-tying device comprising a button-holding member rotatable about its axis and also movable in an axial direction, a cord-manipulating hook, means to insert the same through the eye of a button while retained in the button-holding member and then withdraw said hook, means to present the end of a length of cord to said hook, whereby upon its withdrawing movement said end of the cord is drawn through the eye of the button, means to rotate the button-holding member thereby twisting together the portions of the cord on either side of the eye and at the same time forming a loop in the cord at said eye, and means to pull the end of the cord through the loop.

17. A button-tying device comprising a button-holding member having a nose portion, means to clamp a button in said member with its eye against the nose portion, means to draw the end of a length of cord through the eye of the button, means to move the button-holding member in the direction of its axis, and to rotate the same thereby to twist together the portions of the cord either side of said eye and form a loop in the cord which embraces the nose, means to draw the end of the cord through said loop, and means to strip the loop from the nose and tighten said loop.

18. In a mattress-tufting machine, means to insert a length of cord through a mattress, a button-tying device operating on one side of the mattress to tie a button having an eye to the end of the cord which has been inserted through the mattress, and a second button-tying device operating on the other side of the mattress to tie a second button also having an eye to said cord, each button-tying device having means for inserting an end of the cord through a button eye, forming a loop in the cord and passing the cord end through said loop to tie the button to the cord.

19. In a mattress-tufting machine, means to insert a single length of cord through a mattress, a button-tying device operating on one side of the mattress to tie a button to the end of the cord which has been inserted through the mattress, and a second button-tying device operating on the other side of the mattress to tie a second button to said cord, and means to deliver buttons singly to each button-tying device.

20. In a mattress-tufting machine, the combination with means for supporting a mattress, of a tufting needle, means to cause the latter to penetrate the mattress from one side to the other thereby to carry one end of a length of cord through the mattress and then withdraw the needle, a button-tying device operating above the mattress before the needle is withdrawn for tying a button to said end of the cord, means to cut the cord beneath the mattress, and a second button-tying device to tie a button to the other end of the length of cord extending through the mattress.

21. In a mattress-tufting machine, the combination with means for supporting a mattress, of a tufting needle, means to cause the latter to penetrate the mattress from one side to the other thereby to carry one end of a length of cord through the mattress, a button-tying device operating above the mattress for tying a button to said end of the cord, means to cut the cord beneath the mattress, a second button-tying device to tie a button to the other end of the length of cord extending through the mattress, and means to deliver buttons singly to each button-tying device.

22. In a mattress-tufting machine, the combination with means to pass the end of a length of cord through a mattress, button-tying means to tie a button to said end of the cord, an endless chain button-carrier and a button-transferring device to transfer buttons from the carrier to the button-tying device.

23. In a mattress tufting machine, the combination with button-tying means to tie a button to the end of a cord which has been passed through the mattress, of an endless chain button carrier, and a swinging button-transferring device for transferring buttons singly from the carrier to the button-tying device.

24. In a mattress-tufting machine, the combination with a tufting needle by which a tufting cord or tape is carried through the mattress, of two button-tying devices, one operating on each side of the mattress, to tie buttons to said cord or tape, each button-tying device having means to insert the end of the cord through an eye of a button and then to form a loop in said cord and pass the cord end through said loop thereby to tie the button to the cord.

25. In a mattress-tufting machine, the combination with a tufting needle, of means to insert said needle through a mattress thereby to carry a cord or tape through said mattress and then to withdraw the needle, a button-tying device operating on one side of the mattress to tie a button to said cord before the needle is withdrawn and a second button-tying device operating on the other side of the mattress to tie a second button to said cord.

26. In a mattress-tufting machine, the combination with means to support a mattress, of a tufting needle, means to move the needle upwardly through the mattress thereby to carry a tufting cord through the mattress and then to withdraw the needle, a button-tying device above the mattress to tie a button to said cord while the needle is in the mattress, and a second button-tying device below the mattress to tie a second button to said cord.

27. In a mattress-tufting machine, the combination with means to support a mattress, of a tufting needle, needle-actuating mechanism, which causes the needle to penetrate the mattress from beneath thereby carrying a tufting cord through the mattress and then to withdraw the needle, a button-tying device operating above the mattress to tie a button to the cord while the needle is still penetrating the mattress, and a second button-tying device beneath the mattress to tie a second button to said cord after the needle has been withdrawn from the mattress.

28. In a mattress-tufting machine, the combination with means to support a mattress, of a tufting needle, needle-actuating mechanism which causes the needle to penetrate the mattress from beneath thereby carrying a tufting cord through the mattress and then to withdraw the needle, a button-tying device operating above the mattress to tie a button to the cord while the needle is still penetrating the mattress, means to cut the cord between the needle and mattress after the needle has been withdrawn from the mattress, and a second button-tying device operating beneath the mattress to tie a second button to the portion of the cord remaining in the mattress.

29. In a mattress-tufting machine, the combination with means for supporting a mattress, of means to compress the mattress, a tufting needle, needle-actuating mechanism to cause the needle to penetrate the mattress from beneath at the point where it is compressed, thereby carrying a tufting cord through the mattress, and then to withdraw said needle, a button-tying device operating above the mattress to tie a button to the cord before the needle is withdrawn, means to cut the cord between the needle and the mattress beneath the latter and after the needle has been withdrawn from the mattress, and a second button-tying device operating beneath the mattress to tie a second button to the lower end of the cord length remaining in the mattress.

30. In a mattress-tufting machine for tufting a mattress with a tufting element having an eye, the combination with means to pass one end of a length of cord through a mattress, of a cord manipulating hook to draw said end of the cord through the eye of the tufting element, means to tie said cord end to said eye, a second cord manipulating hook to pass the other end of said cord through the eye of a second tufting element on the side of the mattress opposite to that on which the first tufting element is located and means to tie said cord to the eye of said second tufting element.

31. In a mattress-tufting machine, the combination with means to pass the end of a length of cord through a mattress, of means to place in operative position on one side of the mattress a tufting element having an eye, means to insert the end of the cord through and to tie it to said eye and means to tie a second tufting element to the other end of the cord on the opposite side of the mattress.

32. In a mattress-tufting machine, the combination with means to pass the end of a length of cord through a mattress, of means to place in operative position on one side of the mattress a tufting element having an eye, means to insert the end of the cord through and to tie it to said eye, means to present a second tufting element having an eye in operative position on the opposite side of the mattress and means to insert the other end of said cord through and tie it to the eye of said second tufting element.

33. In a mattress tufting machine, the combination with means to pass one end of a single length of cord through a mattress, means to place a button in operative position on the side of the mattress from which the end of the cord emerges, means to insert said cord through and to tie it to the eye of said button, means to present a second button in operative position on the opposite side of the mattress and means to insert the other end of the cord through and tie it to the eye of the second button.

34. In a mattress tufting machine, the combination with means to pass the end of a cord through a mattress, means to present a button in operative position on the side of the mattress through which said end of the cord emerges, means to pass said end of the cord through and tie it to the eye of said button, means to draw said button against the side of the mattress, means to present a second button in operative position on the opposite side of the mattress and means to insert the other end of the cord through and tie it to the eye of the second button.

35. A mattress-tufting machine comprising mattress-supporting means, means to insert the free end portion of a length of tufting cord through the mattress, means to place a tufting element in operative position relative to such free end, means to form in said end portion of the tufting cord a loop which embraces a portion of the tufting element, means to twist the sides of the loop together, and means to draw the free end of the cord through said loop and tighten the latter.

36. A mattress-tufting machine comprising mattress-supporting means, means to insert the free end portion of a length of tufting cord through the mattress, means to place a tufting element in operative position on the side of the mattress from which the free end portion of the cord emerges, means to form in the cord a loop which embraces a portion of the tufting element, means to twist together the sides of said loop, means to draw the free end of the cord through said loop and tighten the latter, and means to tie a second tufting element to the other end of said tufting cord on the opposite side of the mattress.

37. A mattress-tufting machine comprising mattress-supporting means, means to insert the free end of a length of cord upwardly through said mattress, a tying device above the mattress having means to form a loop in said free end and tie a tufting element thereto, and a second tying device beneath the mattress also having means to form a loop in the cord and tie a second tufting element thereto.

38. A mattress-tufting machine comprising means to support a mattress, means to pass one end of a length of cord through the mattress, a tying device to tie a tufting element to said cord on the side of the mattress from which the cord emerges and a second tying device on the opposite side of the mattress to tie a second tufting element to said cord on said opposite side of the mattress, and means common to both tying devices for operating them in timed relation.

39. A mattress-tufting machine comprising mattress-supporting means, means to present a tufting element in operative position, means to insert a length of tufting cord through the mattress, a loop-forming element to engage the cord and form a loop therein which embraces a portion of the tufting element, means to rotate the loop-forming element to twist together the sides of the loop, and means to draw the end of the cord through the loop.

40. A mattress-tufting machine comprising means to present a tufting element in operative position on one side of a mattress, means to pass the free end portion of a tufting cord through the mattress to said side thereof, a tying device to form a loop in the portion of the cord passed through the mattress, which loop embraces a portion of the tufting element, said tying device having means to twist together the two sides of the loop and to draw the free end of the tufting cord through said loop.

41. A mattress-tufting machine comprising means to present a tufting element in operative position on one side of a mattress, means to pass the free end portion of a tufting cord through the mattress to said side thereof, a tying device to form a loop in the portion of the cord passed through the mattress, which loop embraces a portion of the tufting element, said tying device having means to twist together the two sides of the loop and to draw the free end of the tufting cord through said loop, and a second tying device on the opposite side of the mattress for tying a second tufting element to said cord.

42. A mattress-tufting machine comprising means for supporting a mattress, means to pass the end of a length of cord through the mattress, a rotary holding member having a nose portion, means to hold the tufting element against the nose portion, means to move the holding member in the direction of its axis to cause the nose portion to engage the cord and form a loop therein which embraces a portion of the tufting element, means to rotate the holding member to twist the sides of the loop together, and means to draw the end of the cord through said loop and to shed said loop from the nose portion.

43. A mattress-tufting machine comprising mattress-supporting means, a rotary holding member on one side of the mattress for holding a tufting element, means to pass a length of tufting cord through the mattress and into tying relation with the tufting element, means to move the holding member in the direction of its axis, thereby to form a loop in the cord which embraces a portion of the tufting element, means to rotate the holding element to twist together the sides of the loop, means to draw the end of the cord through said loop and tighten the latter, and means to tie a second tufting element to said cord on the opposite side of the mattress.

WILFRED B. MATHEWSON.